A. H. PETERSON.
Water Coolers and Filters.
No. 158,649. Patented Jan. 12, 1875.
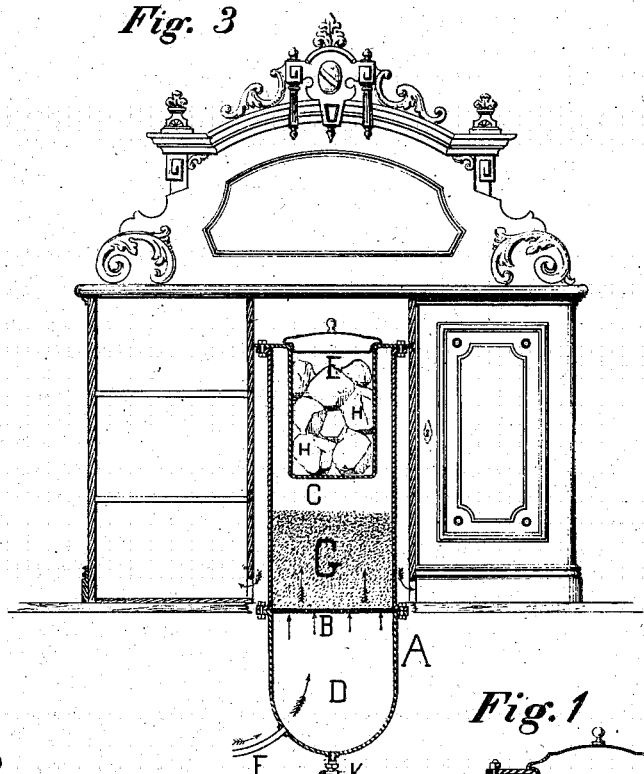
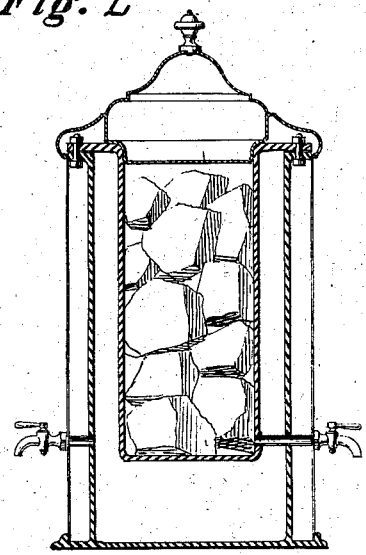
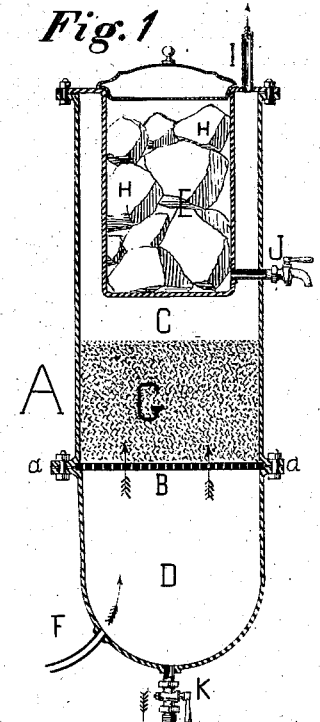
Witnesses:
John Villa
Chr. Martin
Inventor:
Albert H. Peterson
by Francis D. Pastorius
his Atty in fact

UNITED STATES PATENT OFFICE.

ALBERT H. PETERSON, OF PHILADELPHIA, PENNSYLVANIA.

IMPROVEMENT IN WATER COOLERS AND FILTERS.

Specification forming part of Letters Patent No. 158,649, dated January 12, 1875; application filed July 5, 1873.

*To all whom it may concern:*

Be it known that I, ALBERT H. PETERSON, of the city and county of Philadelphia and State of Pennsylvania, have invented an Improved Combined Water Filter and Cooler, of which the following is a specification:

The filter and cooler consists of a vertical chamber of iron or other suitably strong and durable material, which is divided by a horizontal sieve diaphragm into two chambers. The lower chamber receives the water from the pipe leading from the main, which, in seeking its level, filters through a composition of sand and charcoal into the upper chamber, and surrounds an ice-receptacle. The water and the ice do not contact, the temperature of the water being lowered by the vessel in which the ice is contained.

Figure 1 is a vertical section of the filter and refrigerator. Fig. 2 is a modification of Fig. 1. Fig. 3 shows the filter and cooler applied to a refrigerator.

A is a vertical chamber, which is divided by the sieve diaphragm B into the upper and lower chambers C D, bolted together at the flanges *a*. The upper chamber contains the ice-receptacle E. The water from the main enters the chamber D by the inlet-pipe F. In seeking its level it rises through the openings in the sieve B, and filters in its passage through the composition of sand and charcoal G. It fills the chamber C, and completely surrounds the vessel E. The coldness of the ice H is imparted by the walls of its containing-vessel E to the water in the chamber C, whereby its temperature is reduced, and it rendered fit for drinking purposes. When being used, it is drawn off through the pipe I at the top. A draw-off cock, J, removes the ice-drippings from the ice-chamber. The cock K at the bottom of the lower chamber D is the means whereby the whole vessel A is cleaned.

I claim as may invention—

The filter and cooler A, composed of the chambers C D, the sieve B, and the ice-vessel E, substantially as and for the purpose shown and described.

In testimony whereof I hereunto sign my name in presence of two subscribing witnesses.

ALBERT H. PETERSON.

Witnesses:
 EDMUND P. COCHRAN,
 FRANCIS D. PASTORIUS.